United States Patent
Zhao et al.

(10) Patent No.: US 10,667,091 B1
(45) Date of Patent: May 26, 2020

(54) WIRELESS POSITIONING METHOD AND SERVER AND STORAGE MEDIUM WITH THE SAME

(71) Applicant: UBTECH ROBOTICS CORP LTD, Shenzhen (CN)

(72) Inventors: Yongsheng Zhao, Shenzhen (CN); Youjun Xiong, Shenzhen (CN); Yu Tang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/396,691

(22) Filed: Apr. 28, 2019

(30) Foreign Application Priority Data

Dec. 27, 2018 (CN) .......................... 2018 1 1613338

(51) Int. Cl.
*H04W 24/00* (2009.01)
*H04W 4/029* (2018.01)

(52) U.S. Cl.
CPC .................. *H04W 4/029* (2018.02)

(58) Field of Classification Search
CPC ...... H04L 67/12; H04W 4/023; H04W 72/04; H04W 76/14; H04M 2250/10
See application file for complete search history.

(56) References Cited

U.S. PATENT DOCUMENTS

| | | | |
|---|---|---|---|
| 10,015,769 B1* | 7/2018 | Younis | H04W 64/00 |
| 2016/0266232 A1* | 9/2016 | Chen | G01S 19/22 |
| 2017/0212210 A1* | 7/2017 | Chen | G01S 5/06 |

* cited by examiner

*Primary Examiner* — Khalid W Shaheed

(57) ABSTRACT

The present disclosure provides a wireless positioning method as well as a server and a storage medium with the same. The method includes: obtaining a current ranging value between a first positioning device and a second positioning device, where there is no obstruction between the first positioning device and the second positioning device; determining a distance of the first positioning device and the second positioning device in a depth direction of a tunnel based on the current ranging value; and obtaining a current coordinate of the second positioning device based on the distance. In the above-mentioned manner, the automatic updating of the coordinate of the reference base station in the tunnel can be realized, the times of repeated measurements of the base station are reduced, thereby improving the construction efficiency of the tunnel and saving working loads.

17 Claims, 9 Drawing Sheets

Perform a smooth filtering on each obtained ranging value between the first positioning device and the second positioning device — S510

Project the smooth filtered ranging value in the depth direction of the tunnel to obtain the distance of the first positioning device and the second positioning device in the depth direction of the tunnel — S520

FIG. 6

WIRELESS POSITIONING METHOD AND SERVER AND STORAGE MEDIUM WITH THE SAME

CROSS REFERENCE TO RELATED APPLICATIONS

This application claims priority to Chinese Patent Application No. 201811613338.9, filed Dec. 27, 2018, which is hereby incorporated by reference herein as if set forth in its entirety.

BACKGROUND

1. Technical Field

The present disclosure relates to wireless positioning technology, and particularly to a wireless positioning method as well as a server and a storage medium with the same.

2. Description of Related Art

With the development of transportation industry, the transportation of passengers, industrial supplies, and daily necessities inevitably rely on roads and railways. In which, it is often necessary to cross tunnels when constructing railways and highways, and there are more and more in-tunnel construction projects with the advent of subways.

In the process of tunnel construction, it often needs a system using wireless positioning technology to obtain the position of the construction personnel or construction equipment. At the places near the construction excavation surface of a tunnel, supports are required for constructing the top, and it generally uses two movable trolleys to assist the construction.

In the prior art, the positioning of the personnel in the construction area inside a tunnel is generally realized by installing a base station on a trolley (because the wall of the tunnel is not yet constructed, the base station cannot be installed on the wall) so as to position the trolley. However, whenever the trolley is moved, it is necessary for the staff to repeatedly measure the coordinate of the base station installed on the trolley, which inevitably increases the workload of the staff.

BRIEF DESCRIPTION OF THE DRAWINGS

To describe the technical schemes in this embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

FIG. 6 is a flow chart of an embodiment of step S500 of the wireless positioning method of FIG. 5.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

In the present application, the terms "first", "second", and "third" are for descriptive purposes only, and are not to be comprehended as indicating or implying the relative importance or implicitly indicating the amount of technical features indicated. Thus, the feature limited by "first", "second", and "third" may include at least one of the feature either explicitly or implicitly. In the description of the present application, the meaning of "a plurality" is at least two, for example, two, three, and the like, unless specifically defined otherwise.

Figure 1:
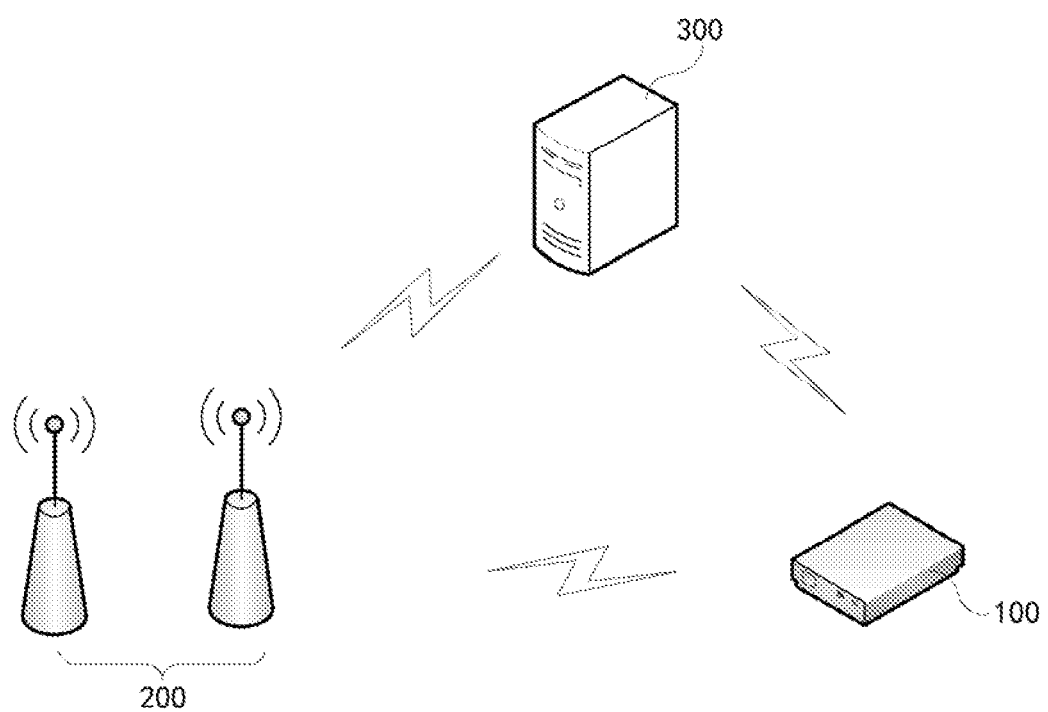
FIG. 1 is a schematic block diagram of an in-tunnel wireless positioning system according an embodiment of the present disclosure.

FIG. 1 is a schematic block diagram of an in-tunnel wireless positioning system according an embodiment of the present disclosure. As shown in FIG. 1, in this embodiment, a wireless positioning system is provided, which is for use in a tunnel. The positioning system includes at least one first positioning device 100, a plurality of second positioning devices 200, and a server 300. The at least one first positioning device 100 and the plurality of second positioning devices 200 are within the tunnel. The first positioning device 100, the second positioning devices 200, and the server 300 communicate in a wireless manner.

The first positioning device 100 may be a tag. In which, the tag is a device which is to be positioned in an ultra-wideband (UWB) positioning system, and the tag is moveable. In this embodiment, the radio frequency (RF) signals emitted from the tag are UWB signals, and a power module, a motion sensor, a microcontroller unit (MCU) module, a UWB RF module, and the like are integrated inside the tag. In this embodiment, the first positioning device 100 can be a fixed device installed within the tunnel.

The second positioning device 200 may be a base station. In an UWB positioning system, the base station is for realizing the ranging with respect to the tag, and the identity (ID) of the tag, the relative distance, and the received signal strength indication (RSSI) is uploaded to the server 300. In which, a power module, a micro controller unit (MCU) module and a wireless fidelity (Wi-Fi) module can be integrated within the base station. In this embodiment, the base station can be installed on a trolley in the tunnel.

In this embodiment, the first positioning device 100 and the second positioning device 200 may be interchanged, that is, the first positioning device 100 may be a base station, and the second positioning device 200 may be a tag, which is not limited herein. In this embodiment, the tag and the base station are both general tag and base station. In which, in addition to the adaptive wireless positioning, the base station may also be taken as a general base station for positioning and other functions. The tag and the base station perform ranging at a fixed frequency, and transmit ranging values to the server 300.

In this embodiment, the server 300 is an information collecting and processing device, which collects the tag information uploaded by all the base stations, then performs storages, calculations, and statistics, and uses the known coordinate of each base station and the distance data of the ranging between each base station and the tag to obtain the coordinate of the tag through triangular positioning and least squares, and then displays the coordinate on an interface of the server 300.

It should be understood that, in this embodiment, in order to facilitate the detailed description of the in-tunnel wireless positioning system, in the case that the accuracy of the positioning of the base station is sufficient, the tunnel is assumed to be linearly arranged in view of a part, and the error of the trolley which is produced in a width direction of the tunnel when it is moved in a depth direction of the tunnel is ignored.

A detailed introduction of three disposition schemes of the positioning devices in the in-tunnel wireless positioning system which are used in the present application are described as follows.

Figure 2:
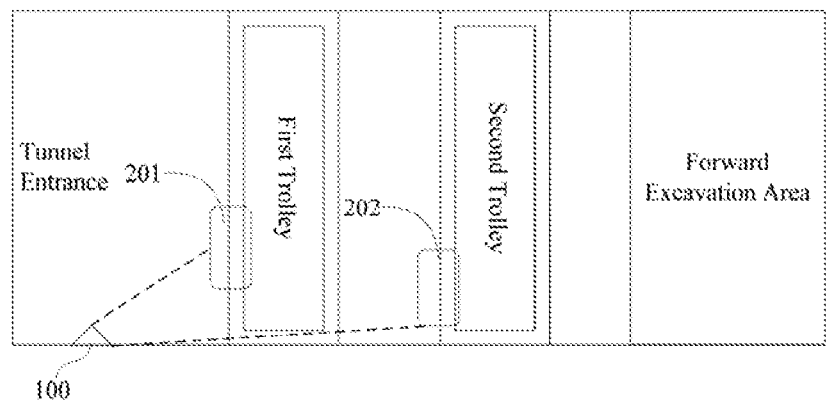
FIG. 2 is a schematic diagram of a first application scenario of the in-tunnel wireless positioning system of FIG. 1.

FIG. 2 is a schematic diagram of a first application scenario of the in-tunnel wireless positioning system of FIG. 1. As shown in FIG. 2, one first positioning device 100 is first fixedly disposed on a constructed inner wall of a tunnel, where the first positioning device 100 is disposed at a position corresponding to the direction of the entrance of the tunnel. In this embodiment, the first positioning device 100 may be a reference tag. Then, one second positioning device 201 is disposed on a first trolley in the tunnel. The second positioning device 201 may be a reference base station, and the position to dispose the second positioning device 201 has to ensure as much as possible that the ranging with respect to the first positioning device 100 will not be obstructed by construction personnel or equipment. In other embodiments, the first positioning device 100 may be a reference base station, and the second positioning device 201 may be a reference tag, which may be interchanged, and is not limited herein.

Furthermore, examples of the application scenarios of the in-tunnel wireless positioning system are described as follows.

1. A space for disposing the second positioning device can be found on the second trolley.

As shown in FIG. 2, in this case, the space for disposing a second positioning device 202 to realize the unobstructed ranging with respect to the first positioning device 100 on the inner wall of the tunnel can be found on the second trolley, and the first positioning device 100 is unobstructed with respect to the second positioning device 201 on the first trolley and the second positioning device 202 on the second trolley, respectively.

2. A space for disposing the second positioning device which can realize the unobstructed ranging with respect to the first positioning device cannot be found on the second trolley.

Figure 3:
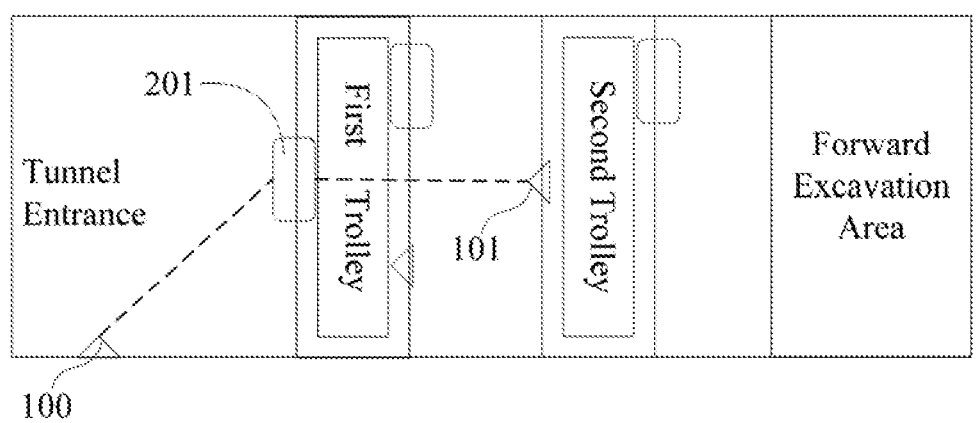
FIG. 3 is a schematic diagram of a second application scenario of the in-tunnel wireless positioning system of FIG. 1.

FIG. 3 is a schematic diagram of a second application scenario of the in-tunnel wireless positioning system of FIG. 1. As shown in FIG. 3, if a space for disposing the second positioning device 202 to realize the unobstructed ranging with respect to the first positioning device 100 cannot be found on the second trolley, it needs to find a space on the second trolley to install a first positioning device 101, such that the second positioning device 201 on the first trolley and the first positioning device 101 on the second trolley realize the unobstructed ranging under a changing scene.

3. A space for disposing the second positioning device which can realize the unobstructed ranging with respect to the first positioning device and the second positioning device on the first trolley cannot be found on the second trolley.

Figure 4:
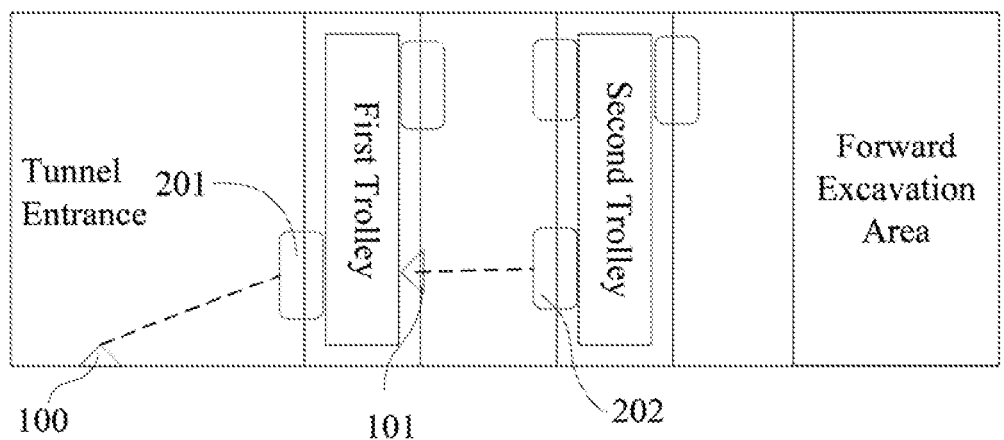
FIG. 4 is a schematic diagram of a third application scenario of the in-tunnel wireless positioning system of FIG. 1.

FIG. 4 is a schematic diagram of a third application scenario of the in-tunnel wireless positioning system of FIG. 1. As shown in FIG. 4, if a space for disposing the second positioning device to realize the unobstructed ranging with respect to the first positioning device 100 and the second positioning device 201 cannot be found on the second trolley, it needs to dispose a positioning device on the first trolley and the second trolley, respectively.

For instance, it may dispose one first positioning device 101 on the first trolley, and dispose one second positioning device 202 on the second trolley, such that the unobstructed ranging under a changing scene can be realized between the two positioning devices. In which, the first positioning device 101 is a reference tag, and the second positioning device 202 is a reference base station. In other embodiments, the second positioning device 202 may be installed on the first trolley, and the first positioning device 101 may be installed on the second trolley, which is not limited herein.

It should be understood that, in this embodiment, the positioning system is described by using two trolleys. In other embodiments, the amount of the trolleys may be three or more, which is not limited herein.

Figure 5:
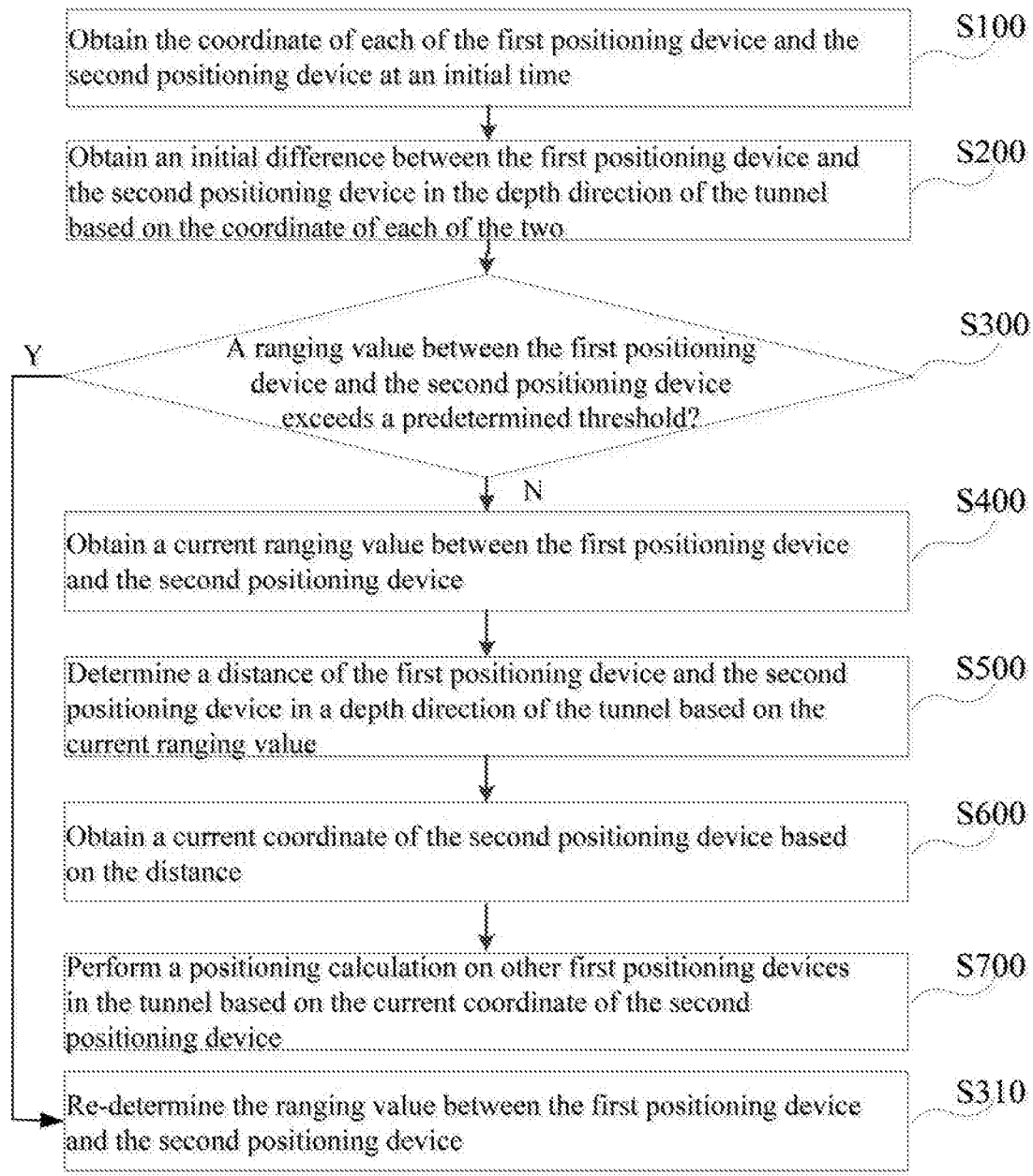
FIG. 5 is a flow chart of an in-tunnel wireless positioning method according to an embodiment of the present disclosure.
Figure 8:
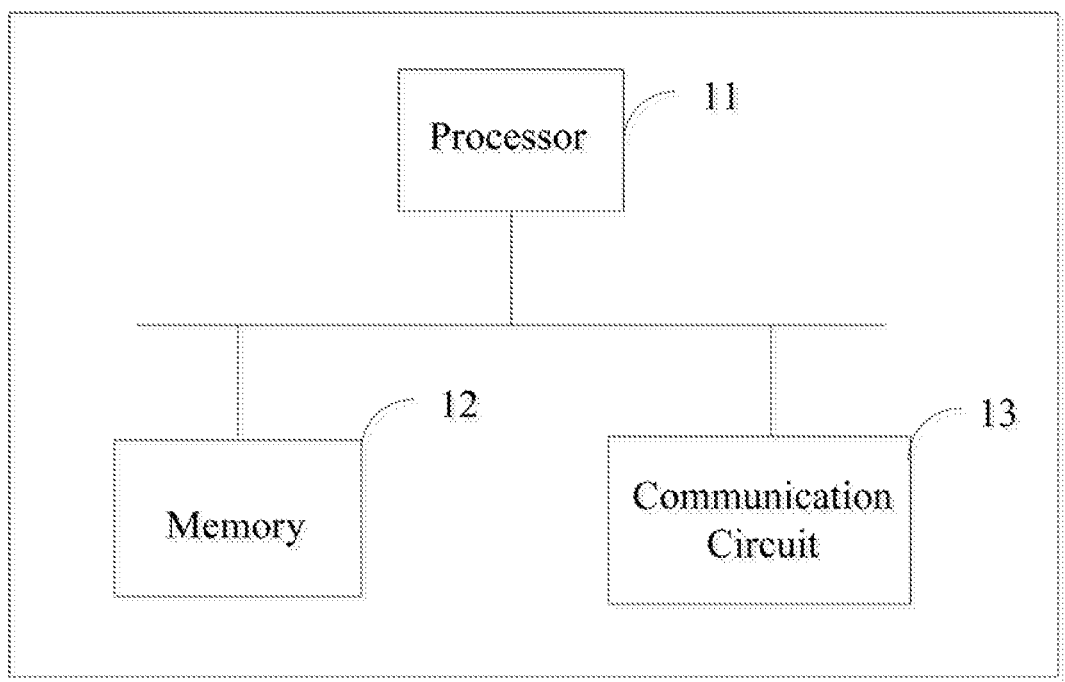
FIG. 8 is a schematic block diagram of an in-tunnel wireless positioning server according an embodiment of the present disclosure.

The above-mentioned examples are three different application scenarios of the in-tunnel wireless positioning system of the present application. The self-positioning method of the mobile base station in the three application scenarios are described in detail as follows. FIG. 5 is a flow chart of an in-tunnel wireless positioning method according to an embodiment of the present disclosure. In this embodiment, a wireless positioning method is provided. The method is a computer-implemented method executable for a processor, which may be implemented through and applied to a wireless positioning server as shown in FIG. 8, or through a storage medium. As shown in FIG. 5, in this embodiment, the wireless positioning method includes the following steps.

S100: obtaining the coordinate of each of the first positioning device and the second positioning device at an initial time.

After the positioning devices of the in-tunnel wireless positioning system is disposed, it needs to first measure the initial coordinate of each positioning device in the tunnel, that is, the initial coordinate of each reference base station, reference tag, and general base station, and then the ID and the initial coordinate of the reference tag and the reference base station are further set in the positioning system as initial values.

In this embodiment, it is described in detail by assuming that the first positioning device is a reference tag and the second positioning device is a reference base station.

Referring to FIG. 2-FIG. 4, it is assumed that the coordinate of the positioning device in the in-tunnel wireless positioning system is (Xn, Yn, Zn). In which, X, Y, and Z respectively represent three directions in the tunnel, X is a depth direction of the tunnel, Y is a width direction of the tunnel, and Z is a height direction of the tunnel.

For instance, as shown in FIG. 2, it is assumed that the initial coordinate of the first positioning device 100 is (X1, Y1, Z1), the initial coordinate of the second positioning device 201 on the first trolley is (X2, Y2, Z2), and the initial coordinate of the second positioning device 202 on the second trolley is (X3, Y3, Z3).

For instance, as shown in FIG. 3, it is assumed that the initial coordinate of the first positioning device 100 is (X1, Y1, Z1), the initial coordinate of the second positioning device 201 is (X2, Y2, Z2), and the initial coordinate of the first positioning device 101 on the second trolley is (X4, Y4, Z4).

For instance, as shown in FIG. 4, it is assumed that the initial coordinate of the first positioning device 100 is (X1, Y1, Z1), and the initial coordinate of the second positioning device 201 is (X2, Y2, Z2), the initial coordinate of the first positioning device 101 on the first trolley is (X5, Y5, Z5), and the initial coordinate of the second positioning device 202 on the second trolley is (X6, Y6, Z6).

S200: obtaining an initial difference between the first positioning device and the second positioning device in the depth direction of the tunnel based on the coordinate of each of the first positioning device and the second positioning device.

Similarly, the initial difference between the first positioning device and the second positioning device in the depth direction of the tunnel is also obtained according to the above-mentioned three cases. It should be understood that, in this embodiment, the tunnel is assumed to be linearly arranged in view of a part, and the error of the trolley which is produced in the width direction of the tunnel when it is moved in the depth direction of the tunnel is ignored. That is, when the trolley is moved toward a forward excavation direction of the tunnel, the error produced by the first positioning device and the second positioning device in the width direction and the height direction of the tunnel can be ignored. In other words, Y direction and Z direction of the first positioning device is considered to be unchanged while it is in the tunnel.

For instance, as shown in FIG. 2, the initial difference between the first positioning device 100 and the second positioning device 201 in the depth direction of the tunnel is $\Delta X1=X2-X1$, and the initial difference of the first positioning device 100 and the second positioning device 202 in the depth direction of the tunnel is $\Delta X2=X3-X1$.

For instance, as shown in FIG. 3, the initial difference between the first positioning device 100 and the second positioning device 201 in the depth direction of the tunnel is $\Delta X1=X2-X1$, and the initial difference between the first positioning device 100 and the first positioning device 101 in the depth direction of the tunnel is $\Delta X3=X4-X1$.

For instance, as shown in FIG. 4, the initial difference between the first positioning device 100 and the second positioning device 201 in the depth direction of the tunnel is $\Delta X1=X2-X1$, and the initial difference between the first positioning device 100 and the second positioning device 202 in the depth direction of the tunnel is $\Delta X4=X6-X1$.

S300: determining whether a ranging value between the first positioning device and the second positioning device exceeds a predetermined threshold.

It should be understood that, in this embodiment, the first trolley and the second trolley are disposed with the first positioning device and the second positioning device, respectively, and the ranging value between the first positioning device and the second positioning device needs to be within the range of the predetermined threshold. If the ranging value of the first positioning device and the second positioning device exceeds the predetermined threshold, the ranging value between the two will be inaccurate. Therefore, in this embodiment, an interval may be set, for example, the ranging value of the first positioning device and the second positioning device can be re-confirmed every 15 seconds, 30 seconds, or 45 seconds to ensure that the ranging value of the first positioning device and the second positioning device are within the range of the predetermined threshold, so as to guarantee the accuracy of positioning.

In this embodiment, if it is determined that the ranging value between the first positioning device and the second positioning device exceeds the predetermined threshold, step S310 is executed; otherwise, if it is determined that the ranging value between the first positioning device and the second positioning device does not exceed the predetermined threshold, step S400 is executed.

S310: re-determining the ranging value between the first positioning device and the second positioning device.

It should be understood that, as the tunnel in construction is excavated forward, the trolleys in the tunnel gradually advances inward, and the ranging value between the first positioning device and the second positioning device shall exceed its measurement range, hence it needs to re-determine the ranging value between the first positioning device and the second positioning device. In this embodiment, the first positioning device can be disassembled and installed on the inner wall of the tunnel which is closer to the trolleys, and the coordinate of the first positioning device is measured again to take as the initial value for setting in the positioning system, and then the system is restarted, that is, step S100 is executed.

It should be understood that, in this embodiment, the steps S100-S300 are not necessary steps, and those skilled in the art may modify or omit the steps according to actual usage.

S400: obtaining a current ranging value between the first positioning device and the second positioning device, where there is no obstruction between the first positioning device and the second positioning device.

In the above-mentioned three application scenarios, the first positioning device (i.e., the reference tag) and the second positioning device ((i.e., the reference base station) can realize the unobstructed ranging under a changing scene (that is, a scene that the trolleys in the tunnel are moved toward the forward excavation direction of the tunnel).

In this embodiment, the ranging between the reference tag and the reference base station can be implemented by the method as follows.

The reference tag (i.e., the first positioning device) transmits broadcast information for searching; the reference base station (i.e., the second positioning device) receives the broadcast information and uploads tag information in the broadcast information to the server; the server collects the tag information, selects a base station identifier, and transmits the base station identifier to the tag; the tag performs ranging with respect to the corresponding base station based on the base station identifier of the corresponding base station; the base station uploads the result of the ranging to the server, and the server calculates the coordinate of the tag based on the coordinate of the base station and the result of the ranging so as to obtain the position (coordinate) of the tag.

In this embodiment, as shown in FIG. 2, it can be obtained based on the above-mentioned algorithm that the ranging value between the first positioning device 100 and the second positioning device 201 is d1, and the ranging value between the first positioning device 100 and the second positioning device 202 is d2.

As shown in FIG. 3, it can be obtained based on the above-mentioned algorithm that the ranging value between the first positioning device 100 and the second positioning device 201 is d1, and the ranging value between the first positioning device 101 and the second positioning device 201 is d3.

As shown in FIG. 4, it can be obtained based on the above-mentioned algorithm that the ranging value between the first positioning device 100 and the second positioning device 201 is d1, and the ranging value between the first positioning device 101 and the second positioning device 202 is d4.

S500: determining a distance of the first positioning device and the second positioning device in a depth direction of the tunnel based on the current ranging value.

FIG. 6 is a flow chart of an embodiment of step S500 of the wireless positioning method of FIG. 5. As shown in FIG. 6, step S500 includes the following sub-steps.

S510: performing a smooth filtering on each obtained ranging value between the first positioning device and the second positioning device.

In step S510, a smooth filtering is performed on each frame of the ranging value between all the first positioning devices (i.e., the reference tags) and the second positioning device (i.e., the reference base station) on different trolley, for example, using Kalman filtering to perform data processing so that the floating range of the ranging value is reduced and the movement trajectory becomes smooth, thereby obtaining a relatively stable ranging value.

S520: projecting the smooth filtered ranging value in the depth direction of the tunnel to obtain the distance of the first positioning device and the second positioning device in the depth direction of the tunnel.

A projection calculation of the depth direction of the tunnel is performed on the smoothed ranging value of all the reference tags to obtain a projection distance D of the ranging value in the depth direction of the tunnel, where the projection distance D of the ranging value in the depth direction meets:

$$D=\sqrt{(d)^2-(Ya-Yt)^2-(Za-Zt)^2} \quad (1)$$

where, Ya and Yt represent the coordinates of the reference base station and the reference tag in the Y direction of the tunnel, respectively, and Za and Zt represent the coordinates of the reference base station and the reference tag in the Z direction of the tunnel, respectively.

In this embodiment, based on the above-mentioned formula (1), the projection distance of the current ranging value of the unobstructed ranging between the first positioning device and the second positioning device in the depth direction of the tunnel can be calculated.

For the application scenario in FIG. 2, the ranging value d1 and the ranging value d2 are respectively substituted into the formula (1), and it can be obtained that the distance of the first positioning device 100 and the second positioning device 201 in the depth direction of the tunnel is D1, and the distance of the first positioning device 100 and the second positioning device 202 in the depth direction of the tunnel is D2.

Similarly, for the application scenario in FIG. 3, the ranging value d1 and the ranging value d3 are respectively substituted into the formula (1), and it can be obtained that the distance of the first positioning device 100 and the second positioning device 201 in the depth direction of the tunnel is D1, and the distance of the first positioning device 101 and the second positioning device 201 in the depth direction of the tunnel is D3.

Similarly, for the application scenario in FIG. 4, the ranging value d1 and the ranging value d4 are respectively substituted into the formula (1), and it can be obtained that the distance of the first positioning device 100 and the second positioning device 201 in the depth direction of the tunnel is D1. In the application scenario, it is assumed that the first positioning device 101 on the first trolley can perform ranging calculation with respect to the plurality of second positioning devices on the second trolley, and an average value of the distances in the depth direction of the tunnel which are calculated by the first positioning device 101 and the plurality of second positioning device is calculated, where the average value is represented as D4.

S600: obtaining a current coordinate of the second positioning device based on the distance.

Figure 7:
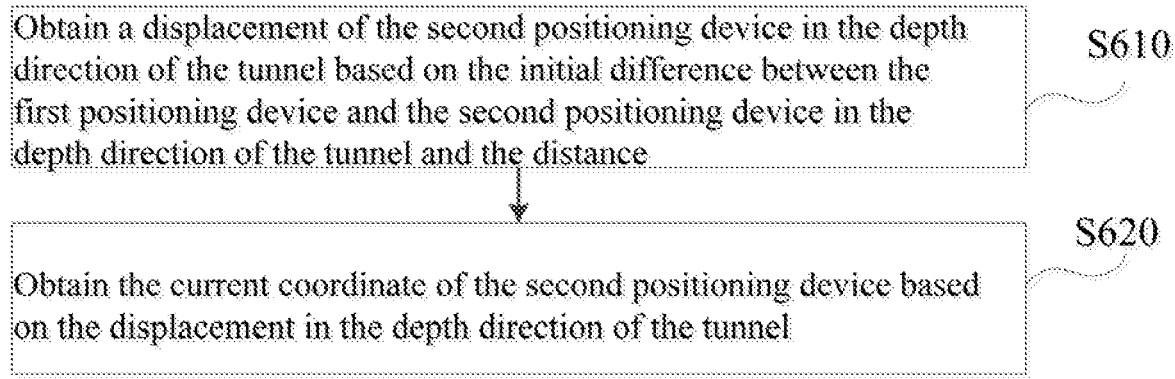
FIG. 7 is a flow chart of an embodiment of step S600 of the wireless positioning method of FIG. 5.

FIG. 7 is a flow chart of an embodiment of step S600 of the wireless positioning method of FIG. 5. As shown in FIG. 7, step S600 includes the following sub-steps.

S610: obtaining a displacement of the second positioning device in the depth direction of the tunnel based on the initial difference between the first positioning device and the second positioning device in the depth direction of the tunnel and the distance.

In this embodiment, after the projection distance of the first positioning device and the second positioning device in the depth direction of the tunnel is obtained in step S500, which is used in combination with the initial difference between the first positioning device and the second positioning device in the depth direction of the tunnel that is obtained in step S200 to calculate the displacement of the second positioning device in the depth direction of the tunnel with respect to the initial time.

For the application scenario in FIG. 2, it can be calculated to obtain the displacement M1=D1−ΔX1 of the second positioning device 201 in the depth direction of the tunnel with respect to the initial time, and the displacement M2=D2−ΔX2 of the second positioning device 202 in the depth direction of the tunnel with respect to the initial time.

For the application scenario in FIG. 3, it can be calculated to obtain the displacement M1=D1−ΔX1 of the second positioning device 201 in the depth direction of the tunnel with respect to the initial time, and the displacement M3=D1+D3−ΔX3 of the first positioning device 101 in the depth direction of the tunnel with respect to the initial time is calculated.

For the application scenario in FIG. 4, it can be calculated to obtain the displacement M1=D1−ΔX1 of the second positioning device 201 in the depth direction of the tunnel with respect to the initial time, and the displacement M4=D1+D4+(X5−X2)−ΔX4 of the second positioning device 201 in the depth direction of the tunnel with respect to the initial time.

S620: obtaining the current coordinate of the second positioning device based on the displacement in the depth direction of the tunnel.

In this embodiment, in the above-mentioned three application scenarios, after obtaining the position values (the coordinate) of the second positioning devices on the first trolley and the second trolley in the depth direction of the tunnel, the coordinates of all the second positioning devices (i.e., base stations or reference base stations) on the first trolley and the second trolley in the depth direction of the tunnel can be synchronously updated based on the displacement.

In this embodiment, as shown in FIG. 2, the updated coordinate of the second positioning device 201 in the depth direction of the tunnel is $X2'=X2+M1$, and the current coordinate of the second positioning device 201 is (X2+M1, Y2, Z2). Similarly, the updated coordinate of the second positioning device 202 in the depth direction of the tunnel is $X3'=X3+M2$, and the current coordinate is (X3+M2, Y3, Z3).

As shown in FIG. 3, the updated coordinate of the first positioning device 101 in the depth direction of the tunnel is $X4'=X4+M3$, and the current coordinate is (X4+M3, Y4, Z4).

As shown in FIG. 4, the updated coordinate of the second positioning device 202 in the depth direction of the tunnel is $X6'=X6+M4$, and the current coordinate is (X6+M4, Y6, Z6).

It should be understood that, under the premise that the coordinates in the width direction and the height direction of the tunnel are unchanged, when the displacement of one second positioning device (i.e., a reference base station) on the trolley in the depth direction of the tunnel with respect to the initial time is calculated, the coordinates of all the base stations on the trolley can be updated synchronously. Furthermore, the updated current coordinate of all the base stations are uploaded to the server for storage.

S700: performing a positioning calculation on other first positioning devices in the tunnel based on the current coordinate of the second positioning device.

It should be understood that, after a trolley in the tunnel is moved, the positions of all the base stations (i.e., the second positioning devices) on the trolley change. By using the wireless positioning method, the coordinates of all the base stations on the trolley can be updated in real time. After obtaining the current coordinate of the reference base station, the positioning calculation may be performed on another first positioning device (i.e., the reference tags) in the tunnel. In which, the first positioning device may be in the form of a work card, a wristband bracelet, and the like which is fixed on the helmet of the construction personnel, and may be in other forms, which is not limited herein.

In this embodiment, the positioning and ranging calculations may adopt, but is not limited to, TOA triangular positioning method based on ranging, TDOA time difference positioning method based on distance difference, and the like.

In the above-mentioned embodiment, the distance of the reference base station and the reference tag that are disposed in the tunnel for realizing the unobstructed ranging in the depth direction of the tunnel at the current time is obtained, the current coordinate of the reference base station is obtained by directly updating the current distance in the depth direction of the tunnel based on the reference base station and the reference tag without considering the influence of the width direction and the height direction of the tunnel, thereby realizing the automatic updating of the coordinate of the reference base station in the tunnel, reducing the times of repeated measurements to the base station, thereby improving the construction efficiency of the tunnel and saving working loads.

FIG. 8 is a schematic block diagram of a wireless positioning server according to an embodiment of the present disclosure. As shown in FIG. 8, in this embodiment, a wireless positioning server is provided. The server includes a processor 11, and a memory 12 and a communication circuit 13 which are coupled to the processor 11. In this embodiment, the processor 11 can include a MCU module, and the communication circuit 13 can include a Wi-Fi module.

The memory 12 is configured to store a computer program which includes instructions for implementing any of the above-mentioned wireless positioning methods. In one example, the computer program includes: instructions for obtaining a current ranging value between a first positioning device and a second positioning device, where there is no obstruction between the first positioning device and the second positioning device; determining a distance of the first positioning device and the second positioning device in a depth direction of a tunnel based on the current ranging value; and obtaining a current coordinate of the second positioning device based on the distance.

The processor 11 is configured to execute the instructions in the computer program stored in the memory 12.

In which, the processor 11 may also be known as a central processing unit (CPU). The processor 11 may be an integrated circuit chip with signal processing capability. The processor 11 may also be a general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor 11 may also be any conventional processor.

Figure 9:
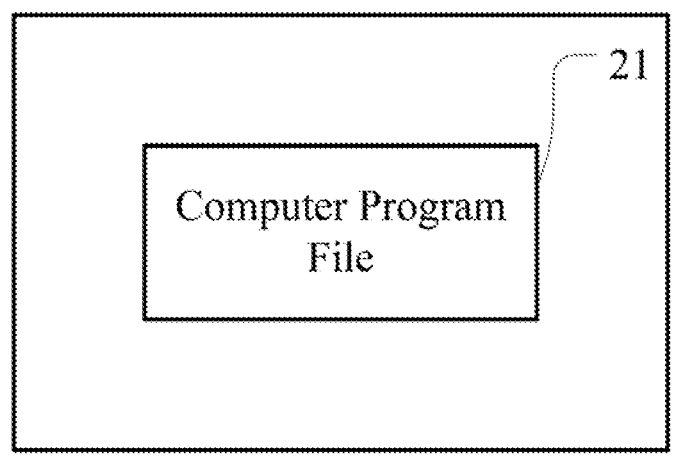
FIG. 9 is a schematic block diagram of a non-transitory computer readable storage medium according to an embodiment of the present disclosure.

FIG. 9 is a schematic block diagram of a non-transitory computer readable storage medium according to an embodiment of the present disclosure. As shown in FIG. 9, in this embodiment, a non-transitory computer readable storage medium is provided, which is configured to store a computer program file 21 capable of implementing all of the above-mentioned methods, where the computer program file 21 may be stored in the above-mentioned storage medium in the form of a software product, which includes a number of instructions for enabling a computer device (which can be a personal computer, a server, a network device, etc.) or a processor to execute all or a part of the steps of the methods described in each of the embodiments of the present disclosure. The above-mentioned storage device includes a variety of media such as a USB disk, a mobile hard disk, a read-only memory (ROM), a random access memory (RAM), a magnetic disk, and an optical disk which is capable of storing program codes, or a terminal device such as a computer, a server, a mobile phone, or a tablet.

In the embodiments provided by the present disclosure, it should be understood that the disclosed server and method may be implemented in other manners. For example, the above-mentioned server embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

In addition, the functional units and/or modules in the embodiments may be integrated in one processing unit, or each unit may exist alone physically, or two or more units may be integrated in one unit. The above-mentioned integrated unit may be implemented in the form of hardware or in the form of software functional unit.

In summary, those skilled in the art can easily understand that, the present disclosure provides a wireless positioning method as well as a server and a storage device with the same. In which, the distance of the reference base station and the reference tag that are disposed in the tunnel for realizing the unobstructed ranging in the depth direction of the tunnel at the current time is obtained, the current coordinate of the reference base station is obtained by directly updating the current distance in the depth direction of the tunnel based on the reference base station and the reference tag without considering the influence of the width direction and the height direction of the tunnel, thereby realizing the automatic updating of the coordinate of the reference base station in the tunnel, reducing the times of repeated measurements to the base station, thereby improving the construction efficiency of the tunnel and saving working loads.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented wireless positioning method for an in-tunnel positioning system having at least a first positioning device, a plurality of second positioning devices, and a server, wherein the first positioning device and the plurality of second positioning devices are in a tunnel, an unobstructed ranging with respect to the first positioning device is implemented on at least one of the plurality of the second positioning devices, and the first positioning device, the plurality of second positioning devices, and the server communicate in a wireless manner wherein the method comprises executing on a processor of the server the steps of:
   obtaining an initial difference between the first positioning device and the second positioning device in a depth direction of the tunnel;
   obtaining a current ranging value between the first positioning device and the second positioning device, where there is no obstruction between the first positioning device and the second positioning device;
   determining a distance of the first positioning device and the second positioning device in the depth direction of the tunnel based on the current ranging value; and
   obtaining a current coordinate of the second positioning device based on the distance and the initial difference;
   wherein the step of determining the distance of the first positioning device and the second positioning device in the depth direction of the tunnel based on the current ranging value comprises:
   performing a smooth filtering on each obtained ranging value between the first positioning device and the second positioning device; and
   projecting the smooth filtered ranging value in the depth direction of the tunnel to obtain the distance of the first positioning device and the second positioning device in the depth direction of the tunnel.

2. The method of claim 1, wherein the step of obtaining the initial difference between the first positioning device and the second positioning device in the depth direction of the tunnel comprises:
   obtaining the coordinate of each of the first positioning device and the second positioning device at an initial time; and
   obtaining the initial difference between the first positioning device and the second positioning device in the depth direction of the tunnel based on the coordinate of each of the first positioning device and the second positioning device.

3. The method of claim 2, wherein the step of obtaining the current coordinate of the second positioning device based on the distance and the initial difference comprises:
   obtaining a displacement of the second positioning device in the depth direction of the tunnel based on the initial difference between the first positioning device and the second positioning device in the depth direction of the tunnel and the distance; and
   obtaining the current coordinate of the second positioning device based on the displacement in the depth direction of the tunnel.

4. The method of claim 1, wherein before the step of obtaining the current ranging value between the first positioning device and the second positioning device comprises:
   determining whether the ranging value between the first positioning device and the second positioning device exceeds a predetermined threshold every preset interval;
   re-determining the ranging value between the first positioning device and the second positioning device, in response to the ranging value between the first positioning device and the second positioning device exceeding the predetermined threshold;
   executing the step of obtaining the current ranging value between the first positioning device and the second positioning device, in response to the ranging value between the first positioning device and the second positioning device not exceeding the predetermined threshold.

5. The method of claim 1, further comprising:
   performing a positioning calculation on other first positioning devices in the tunnel based on the current coordinate of the second positioning device.

6. The method of claim 1, wherein the first positioning device and the second positioning device is respectively one of a positioning base station or a positioning tag.

7. The method of claim 1, wherein the coordinate of each of the first positioning device and the second positioning device in a height direction and a width direction of the tunnel do not change.

8. A server for an in-tunnel positioning system having at least a first positioning device, a plurality of second positioning devices, and the server, wherein the first positioning device and the plurality of second positioning devices are in a tunnel, an unobstructed ranging with respect to the first positioning device is implemented on at least one of the plurality of the second positioning devices, and the first positioning device, the plurality of second positioning devices, and the server communicate in a wireless manner, the server comprises:
   a processor;
   a memory;
   a communication circuit configured to communicate with the first positioning device and the plurality of second positioning devices in the wireless manner; and
   one or more computer programs stored in the memory and executable on the processor, wherein the one or more computer programs comprise:

instructions for obtaining an initial difference between the first positioning device and the second positioning device in a depth direction of the tunnel;

instructions for obtaining a current ranging value between the first positioning device and the second positioning device, where there is no obstruction between the first positioning device and the second positioning device;

instructions for determining a distance of the first positioning device and the second positioning device in the depth direction of the tunnel based on the current ranging value; and instructions for obtaining a current coordinate of the second positioning device based on the distance and the initial difference;

wherein the instructions for determining the distance of the first positioning device and the second positioning device in the depth direction of the tunnel based on the current ranging value comprise:

instructions for performing a smooth filtering on each obtained ranging value between the first positioning device and the second positioning device; and instructions for projecting the smooth filtered ranging value in the depth direction of the tunnel to obtain the distance of the first positioning device and the second positioning device in the depth direction of the tunnel.

9. The server of claim 8, wherein the instructions for obtaining an initial difference between the first positioning device and the second positioning device in a depth direction of the tunnel comprise:

instructions for obtaining the coordinate of each of the first positioning device and the second positioning device at an initial time; and instructions for obtaining the initial difference between the first positioning device and the second positioning device in the depth direction of the tunnel based on the coordinate of each of the first positioning device and the second positioning device.

10. The server of claim 9, wherein the instructions for obtaining the current coordinate of the second positioning device based on the distance and the initial difference comprises:

instructions for obtaining a displacement of the second positioning device in the depth direction of the tunnel based on the initial difference between the first positioning device and the second positioning device in the depth direction of the tunnel and the distance; and instructions for obtaining the current coordinate of the second positioning device based on the displacement in the depth direction of the tunnel.

11. The server of claim 8, wherein the one or more computer programs further comprise:

instructions for determining whether the ranging value between the first positioning device and the second positioning device exceeds a predetermined threshold every preset interval;

instructions for re-determining the ranging value between the first positioning device and the second positioning device, in response to the ranging value between the first positioning device and the second positioning device exceeding the predetermined threshold;

instructions for executing the instructions for obtaining the current ranging value between the first positioning device and the second positioning device, in response to the ranging value between the first positioning device and the second positioning device not exceeding the predetermined threshold.

12. The server of claim 8, the one or more computer programs further comprise:

instructions for performing a positioning calculation on other first positioning devices in the tunnel based on the current coordinate of the second positioning device.

13. The server of claim 8, wherein the first positioning device and the second positioning device is respectively one of a positioning base station or a positioning tag.

14. The server of claim 8, wherein the coordinate of each of the first positioning device and the second positioning device in a height direction and a width direction of the tunnel do not change.

15. A non-transitory computer readable storage medium storing one or more program files for implementing a wireless positioning method executed on a processor of a server, wherein the method is for an in-tunnel positioning system having at least a first positioning device, a plurality of second positioning devices, and the server, wherein the first positioning device and the plurality of second positioning devices are in a tunnel, an unobstructed ranging with respect to the first positioning device is implemented on at least one of the plurality of the second positioning devices, and the first positioning device, the plurality of second positioning devices, and the server communicate in a wireless manner, wherein the one or more program files comprise:

instructions for obtaining an initial difference between the first positioning device and the second positioning device in a depth direction of the tunnel;

instructions for obtaining a current ranging value between the first positioning device and the second positioning device, where there is no obstruction between the first positioning device and the second positioning device;

instructions for determining a distance of the first positioning device and the second positioning device in the depth direction of the tunnel based on the current ranging value; and instructions for obtaining a current coordinate of the second positioning device based on the distance and the initial difference;

wherein the instructions for determining the distance of the first positioning device and the second positioning device in the depth direction of the tunnel based on the current ranging value comprise:

instructions for performing a smooth filtering on each obtained ranging value between the first positioning device and the second positioning device; and instructions for projecting the smooth filtered ranging value in the depth direction of the tunnel to obtain the distance of the first positioning device and the second positioning device in the depth direction of the tunnel.

16. The method of claim 1, wherein one first positioning device is disposed at a position corresponding to a direction of an entrance of the tunnel, one second positioning device is disposed on a first trolley in the tunnel;

one second positioning device is disposed on a second trolley in the tunnel, if a space for disposing the second positioning device to realize the unobstructed ranging with respect to the first positioning device on the direction of the entrance of the tunnel can be found on the second trolley, and the first positioning device on the direction of the entrance of the tunnel is unobstructed with respect to the second positioning device on the first trolley and the second positioning device on the second trolley, respectively;

one first positioning device is disposed on the second trolley, if a space for disposing the second positioning device to realize the unobstructed ranging with respect to the first positioning device cannot be found on the second trolley; and one first positioning device is disposed on the first trolley, and one second positioning device is disposed on the second trolley, or, one second positioning device is disposed on the first trolley, and one first positioning device is disposed on the second trolley, if a space for disposing the second positioning device to realize the unobstructed ranging with respect to the first positioning device and the second positioning device cannot be found on the second trolley.

17. The method of claim 6, wherein the first positioning device is the positioning tag, the second positioning device is the positioning base station, and a ranging between the positioning tag and the positioning base station is implemented by:

transmitting, by the positioning tag, broadcast information for searching;

receiving, by the positioning base station, the broadcast information and uploading tag information in the broadcast information to the server;

collecting, by the server, the tag information, selecting a base station identifier, and transmitting the base station identifier to the positioning tag;

performing, by the positioning tag, ranging with respect to a corresponding positioning base station based on the base station identifier of the corresponding positioning base station;

uploading, by the positioning base station, a result of the ranging to the server; and calculating and obtaining, by the the server, a coordinate of the positioning tag based on a coordinate of the positioning base station and the result of the ranging.

* * * * *